United States Patent [19]

Eckert et al.

[11] 4,381,748

[45] May 3, 1983

[54] METHOD OF REGULATING COMBUSTION IN THE COMBUSTION CHAMBERS OF AN INTERNAL COMBUSTION ENGINE

[75] Inventors: Konrad Eckert, Stuttgart; Klaus Müller, Tamm; Ernst Linder, Mühlacker; Helmut Maurer, Vaihingen; Franz Rieger, Aalen-Wasseralfingen; Winfried Moser, Markgröningen; Horst Franke, Löchgau, all of Fed. Rep. of Germany; Rainer Burkel, Le Chesnay; Cornelius Peter, Paris, both of France

[73] Assignee: Robert Bosch GmbH, Fed. Rep. of Germany

[21] Appl. No.: 274,919

[22] Filed: Jun. 18, 1981

[30] Foreign Application Priority Data

Jun. 20, 1980 [DE] Fed. Rep. of Germany ....... 3023014
Mar. 21, 1981 [DE] Fed. Rep. of Germany ....... 3111135

[51] Int. Cl.³ .................. F02P 5/04; F02M 25/06; F02M 51/02
[52] U.S. Cl. ................................ 123/414; 123/494; 123/571; 73/116
[58] Field of Search ............... 123/414, 416, 425, 571, 123/478, 494; 73/116

[56] References Cited

U.S. PATENT DOCUMENTS 3,978,720 9/1976 Ford ..................................... 73/116

Primary Examiner—Tony M. Argenbright
Attorney, Agent, or Firm—Edwin E. Greigg

[57] ABSTRACT

A method is proposed for regulating the combustion of operating mixtures in the combustion chambers of internal combustion engines. The course of the light intensity of the light resulting from combustion in the combustion chamber is detected and evaluated over the course of combustion; reference control variables derived therefrom are formed for use by subsequently disposed closed-loop control devices of the engine.

29 Claims, 6 Drawing Figures

METHOD OF REGULATING COMBUSTION IN THE COMBUSTION CHAMBERS OF AN INTERNAL COMBUSTION ENGINE

CROSS-REFERENCE TO RELATED PRIOR ART

The only prior art presently known are the following:
MZT Vol. 40, page 242, (1979)
German Offenlegungsschrift No. 25 20 325
German Offenlegungsschrift No. 27 40 044

BRIEF SUMMARY OF THE INVENTION

The present invention relates to an improved method of metering operating substances to be delivered to combustion chambers using light signals arising from illumination from combustion processes including detecting the light intensity over the course or period of combustion, developing a reference control variable signal and triggering from the signal a closed-loop control device of the internal combustion engine.

BACKGROUND OF THE INVENTION

Detecting and evaluating optical combustion chamber signals with the aid of optical transducers is known (MZT 40 (1979), page 242). In this case, the measurement criterion is the presence or absence of light in the combustion chamber as detected by threshold detectors. Controlling the instant of ignition in internal combustion engines with the aid of an optical transducer is also known (German Offenlegungsschrift No. 25 20 325). In the known apparatus, the optical transducer may be a phototransistor, by way of example, which is followed by a threshold switch which detects a voltage increase at the transducer output. This voltage increase is a criterion for the initiation of the second phase of combustion in the combustion chamber of an internal combustion engine. The second phase of combustion follows a first phase, in which the mixture is ignited but in which there is no significant pressure increase and no significant emission of light. In contrast, the second phase is marked not only by a well-defined pressure and temperature increase, but also by the emission of light. It is furthermore known to evaluate the course of pressure, detected with suitable pressure sensors for open- and closed-loop control purposes.

OBJECT AND SUMMARY OF THE INVENTION

The method according to the invention has the advantage that in contrast to the purely qualitative detection and evaluation of the occurrence of light signals, it is possible with high precision and reliability to associate characteristic points of the combustion process with corresponding crankshaft angles, and to evaluate the control variable thus obtained for closed-loop control purposes. The control signals attained are substantially independent of long-term effects and of changes in shape of the course of combustion. For instance, as a combustion chamber window receiving the light signals in a known manner becomes increasingly dirtier, the detectability of the control variable derived in accordance with the invention is affected only after a long period of operation. In the simplest case, this sooting up of the window can be removed during maintenance operations which must in any event be performed for other parts of the engine or the associated motor vehicle; alternatively, it can be monitored and/or removed by suitable monitoring procedures. The formation of the control variable in accordance with the invention has the particular advantage of preventing disturbance pulses, which appear even before the actual increase in pressure or in emitted light intensity, from contributing to incorrect control variables. The use of reference values for characteristic points of the course of light intensity in the combustion chamber during combustion enables the attainment of a control variable which has a very low vulnerability to disturbance; in contrast to the electromechanical or mechanical transducers which are otherwise conventional, this enables the sensitivity of the signal detection to remain uniform over the entire operational range of the internal combustion engine. The method according to the invention can also advantageously be applied without difficulty to operation with mixed fuels, such as a gasoline-methanol mixture.

As a result of the characteristics disclosed hereinafter, advantageous modifications of and improvements to the method are possible.

A particularly simple and inexpensively realized ignition or mixture preparation system can be attained with the method in which a test is made during several sequential cycles as to whether a characteristic point of the light signal curve (for instance, the inflammation point or the maximum value) occurs before or after a fixed set-point crankshaft angle. In one case, 1 signals and in the other case, 0 signals are stored in a shift register. The contents of the shift register are summed up on a running basis and compared with a set-point sum value, which corresponds to the sum of an identical number of 0 and 1 signals. If there is a failure to attain this set-point sum value, or if it is exceeded, then the instant of ignition, for instance, is varied in one or the other direction. In a system functioning according to this method, a very simple and inexpensive transducer suffices; it must merely emit a pulse at this fixed crankshaft angle position. Realization with a microcomputer is easily attained.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 2:
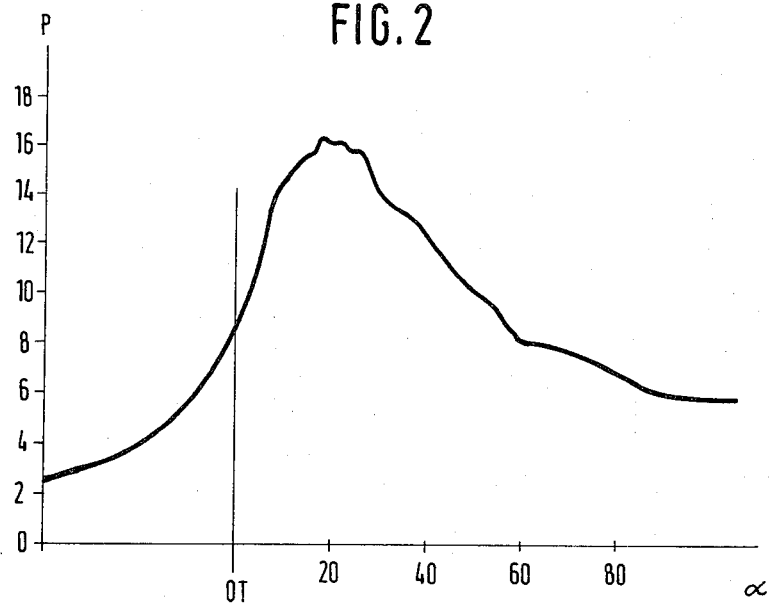
FIG. 2 is a diagram showing the course of pressure in the combustion chamber, plotted over the crankshaft angle.

Present-day closed- and open-loop control systems for internal combustion engines are based substantially on the indirect detection, with suitable transducers, of operating parameters of the engine, such as rpm, throttle valve angle, rpm fluctuations, engine roughness, or exhaust gas composition. In terms of precision, the time-related aspects of transitional events and the presently necessary expense for sensors for detecting these engine parameters, it is very advantageous for those parameters having an effect on combustion to be detected as directly as possible in the combustion chamber of the engine. A known method detects the combustion chamber pressure. As shown in FIG. 2, the combustion chamber pressure reaches a well-defined maximum in the vicinity of top dead center, depending on the instant of ignition, with the attempt being made to have the maximum disposed subsequent to top dead center. The substantial disadvantages of direct measurement of the combustion chamber pressure with the aid of pressure transducers are that the known transducers do not have sufficiently long operational lives, that they are very restricted in their measurement range, and that the pressure signal is affected by manifold types of disturbance. Independently thereof, the advantages of this type of measurement are basically that the load status and the torque can be computed on the basis of the pressure diagram, that the uniformity of the course of combustion can be detected, that knocking fluctuations can be detected from the pressure diagram, and that the position of the maximum relative to top dead center can be ascertained.

Figure 1:
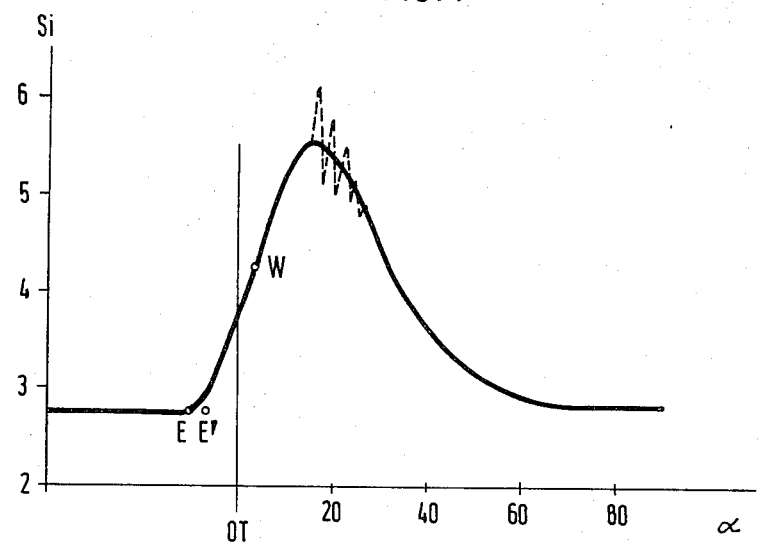
FIG. 1 is a diagram showing the light-intensity signal plotted over the crankshaft angle.

In FIG. 1, the light emission derived from the combustion chamber is shown, with the light intensity being plotted over the crankshaft angle $\alpha$. A comparison of this course with the course of combustion chamber pressure over the crankshaft angle $\alpha$ shows that there is a very great similarity between the two curves, with the exception that the curve showing the course of light intensity over the crankshaft angle has substantially greater continuity. Other important aspects are the clearly recognizable increase in light emission after inflammation and the fact that the fluctuations K occurring during knocking combustion are particularly clearly apparent at the point where the light intensity attains a maximum.

The detection of the light signal in the combustion chamber is effected with the aid of optical sensors. By way of example, a transparent window is provided in the combustion chamber wall, followed by an optoelectric converter. Only a portion of the combustion chamber wall 1 is shown in the drawing; it includes a transparent window 2. As shown in the block circuit diagram, an optoelectric converter 3, which by way of example may be a phototransistor, is disposed on the outside of the window. The optoelectric converter 3 emits an electrical control signal which varies in accordance with the intensity of the light emission of a combustion chamber. Following the optoelectric converter 3 is an adaption circuit 5, by means of which the control signal of which the control signal emitted by the converter is amplified and converted into a voltage $S_i$ proportional to the light intensity. The course taken by this voltage $S_i$ is shown by way of example in FIG. 1, plotted over the crankshaft angle.

As a further transducer, a crankshaft angle transducer 6 of known design is connected to the internal combustion engine. A pulse train appears at the output of this transducer 6, the intervals between the pulses of which indicate equidistant angular positions. The output of the crankshaft angle transducer 6 is connected with an integrator 8, by means of which the pulse train is converted into a voltage proportional to the angle. On the other hand, an integrator of this kind may instead be a counter which produces a digital word corresponding to the crankshaft angle. The counter or integrator 8 is set at a reference crankshaft angle.

Since the signal produced by the combustion process is subjected to certain fluctuations, and since on the other hand the transparency of the window 2 and the characteristic of the optoelectric converter 3 vary with age, the control signal $S_i$ is converted in accordance with the invention into a reference value from which control signals for a closed-loop control apparatus are derived. The control signal $S_i$ can be differentiated in a very simple manner by means of a differentiation device 9 and then evaluated in a subsequent closed-loop control circuit 11 together with the output signal of the integrator 8 and of the crankshaft angle transducer 6. Possible evaluation modes of this type are shown in further detail in the block circuit diagram of FIG. 4. In particular, this signal enables the detection of characteristic points such as turning points of the light-intensity curve, the maximum of the light-intensity curve, and the point where the light-intensity curve increases. As may be learned from FIG. 1, the differential of the light intensity is practically 0 up to the point where inflammation or combustion begins. By comparing the output signal of the differentiation device 9 with a threshold value, the inflammation point can be ascertained in a very simple manner, the output voltage of the integrator 8 (which is proportional to the angle) indicating the associated angle. In a conventional manner, the instant of ignition of the engine (for instance) is then regulated by means of a comparison between set-point and actual values.

On the other hand, it is possible on the basis of the control signal $S_i$ to measure the integral over time, by means of an integrating device 12, or the integral over the crankshaft angle, by means of an integrating device 14. In order to detect the integral over the crankshaft angle, the integrating device is supplied to this end with the output signal of the crankshaft angle transducer 6. Naturally, it is also possible by means of an adaptation circuit to detect the integral of the light-intensity signal relative to the volume of the combustion chamber. The control signals obtained by means of these integrating devices are an expression of the combustion chamber status in terms of pressure and temperature. In other words, the integral values indicate the average gas status in the combustion phase, which can be compared with the average combustion chamber pressure.

In an advantageous manner, the combustion chamber status can be optimized with the aid of a known optimizing device, with a view to attaining maximum output while using the integral of the light intensity.

It is known to ascertain a signal for engine roughness on the basis of fluctuations in average combustion chamber pressure, if the engine is operating in the vicinity of the running limit. In the same manner, the outputs of the integrating devices 12 or 14 produce very clean signals, with which a signal pertaining to smoothness or roughness of engine operation can be generated in the same known manner, and influence can thereby be exerted on the mixture composition, for example. This is accomplished by means of controlling either the fuel-air mixture, supplementary quantities of recirculated exhaust gas or the instant of ignition.

The integrated light-intensity signal can further be used as a reference variable for the detected light signal, as well as for the variables derived therefrom.

A further possible mode of evaluating the control signal $S_i$ is the detection of the maximum light intensity with the aid of a maximum-value detector 15. This detector is effective only in the crankshaft angle range in which the maximum of light intensity is expected to occur. To this end, the detector 15 is triggered via a timing circuit element 17, which is controlled by the output of the integrator 8. This timing circuit 17 enables the functioning of the maximum-value detector 15 only in a selected angular range. The recognition signal for the presence of a maximum value is processed together with the associated crankshaft angle in the closed-loop control circuit. In a manner similar to that discussed and disclosed above in connection with the position of the increase in light intensity, the instant of ignition can be regulated in a known manner using the position of the maximum value. As a reference signal, the output signal of the maximum-value detector 15 is similarly independent of the absolute value for light intensity at this point.

The evaluation of the control signal $S_i$ can be effected with one or more of the evaluation apparatuses described above. In general, it is possible to analyze the actual status of the engine, using a multiplicity of the control signals obtained in this manner.

Figure 3:
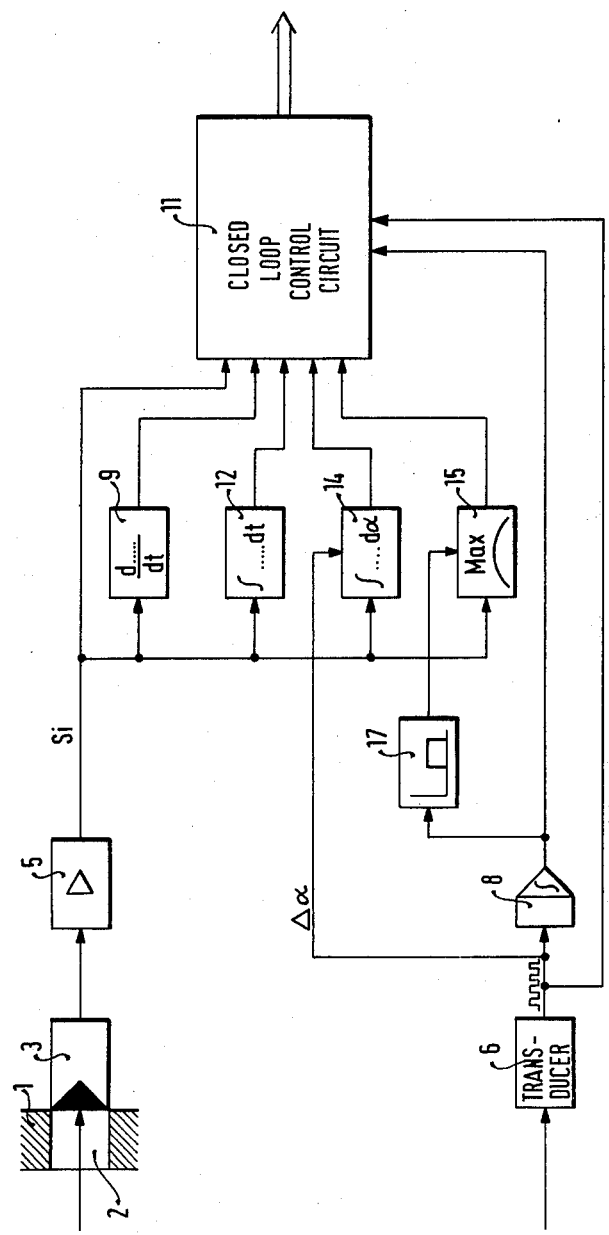
FIG. 3 is the block circuit diagram for various types of evaluation of the course of light intensity plotted over the crankshaft angle.
Figure 4:
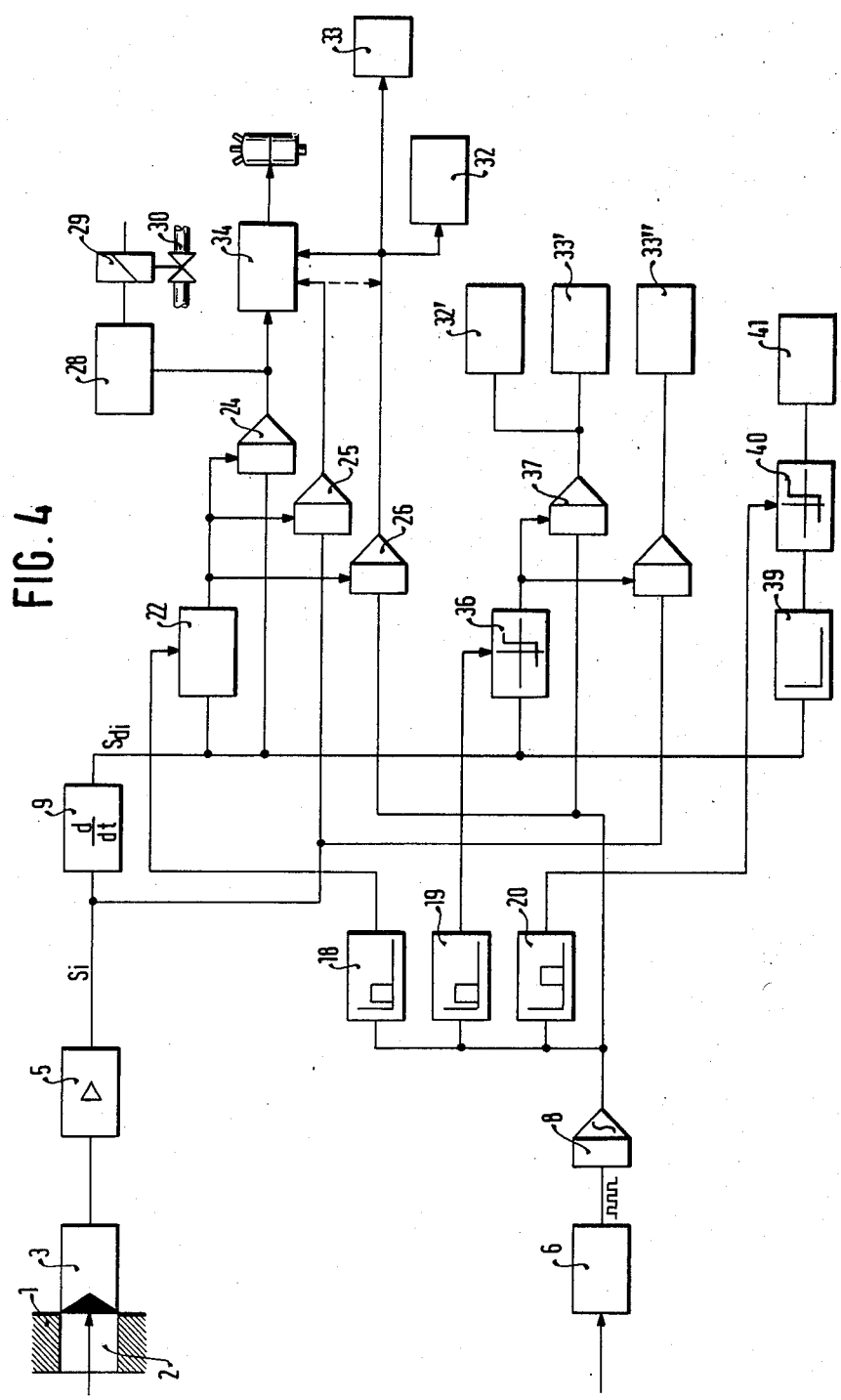
FIG. 4 is a further illustration of types of evaluation of the differentiated light-intensity signal for closed- and open-loop control functions in internal combustion engines.

In FIG. 4, a block circuit diagram is shown in its fundamental outlines, having specialized evaluation possibilities for the differentiated light signal. As described in connection with FIG. 3, a window 2 in a combustion chamber wall 1 is shown here as well, followed by an optoelectric converter 3. The output signal of the optoelectric converter 3 is processed by an adaptation circuit 5 to produce the control signal $S_i$, which represents the course of the light intensity. As has already been described for FIG. 3, the control signal $S_i$ is delivered to a differentiation device 9, in which the signal $dS_i/dt$, or in accordance with the crankshaft angle $dS_i/d\alpha$, is differentiated. The crankshaft angle transducer 6 is provided in this embodiment as well, being followed by the integrator 8, at whose output the voltage is proportional to the crankshaft angle position. A first timing circuit element 18 and/or a second timing circuit element 19 and/or a third timing circuit element 20 is also controlled by the output signal of the integrator 8. The first timing circuit element 18 delivers a switch-on signal to a maximum-value detector 22, so that the maximum-value detector is capable of functioning only within a selected crankshaft angle range. The control signals $dS_i/dt$ or $dS_i/d\alpha$ from the output of the differentiating device 9 is present at the input of the maximum-value detector 22. With the ascertainment of the maximum value within the selected crankshaft angle range, the turning point of the curve in FIG. 1 is ascertained on the basis of the differentiated signal. If the condition of the turning point is present, then the maximum-value detector 22 delivers a switch-on signal to a first signal-value holding or memory means 24 and/or a second signal-value holding means 25 and/or a third signal-value holding means 26. With these signal-value holding means (sample and hold circuits), instant values can be stored in memory and delivered to a subsequent regulating device. Depending upon the way in which the regulation is embodied, one or more of the signal-value holding means 24 is connected with the output of the differentiating device 9 and keeps the control value $dS_i/dt$ or $dS_i/d\alpha$ at a fixed value. This control value represents the inclination of the light-intensity curve and is a criterion for the speed of combustion in the combustion chamber. This control value can be delivered to a control device 28, which controls the quantity of recirculated exhaust gas via an exhaust recirculation valve 29 disposed in an exhaust recirculation line 30.

There are methods of combustion which are associated with high charge turbulence, where combustion may occur too rapidly and may cause knocking. The speed of combustion may be reduced in accordance with the invention, using the apparatus described above, such that at a very high combustion speed a greater quantity of exhaust gas will be recirculated, while when the speed of combustion is dropping, less exhaust gas will be recirculated.

With the aid of the second signal-value holding means 25, whose input is connected with the output of the adaptation circuit 5, the instantaneous value of the light intensity at the turning point W of the light-intensity curve of FIG. 1 can be retained as a fixed value. Furthermore, by means of the third signal-value holding means 25, the crankshaft angle at which the turning point of the light-intensity curve occurs can be retained as a fixed value. With this control value, the instant of ignition in an internal combustion engine can be varied in a known manner in a subsequent open-loop control circuit 32. Furthermore, and again in a manner known per se, a signal for engine roughness can be ascertained on the basis of the magnitude of the signal values for the angular position or the instantaneous light intensity at the turning point. That is, the signal values at the turning point in sequential combustion events are compared with one another, and from this the fluctuations of the signal value are ascertained in terms of the average signal value at the turning point. In a closed-loop engine smoothness control circuit 33 of this kind, a set-point value for the maximum width of fluctuation of the signal value at the turning point is made available, and on the basis of a comparison of the actual value with the set-point value a control signal is formed, which correspondingly corrects one component of the operating mixture of the engine, such as fuel, air, or exhaust gas.

In an appropriately embodied open-loop control circuit 34, which may be a computer circuit, for example, it is furthermore possible on the basis of the three values of the first, second and third signal-value holding means to ascertain a point E', corresponding to the curve-increase point E of the light-intensity curve plotted over the crankshaft angle. It is now possible to control the instant of ignition as well, using this control value pertaining to the crankshaft angle position. Compared with the method described in connection with FIG. 3, this has the advantage of precluding the influence of an error resulting from the selection of the threshold value for the light-intensity value. If the inflammation point is to be detected precisely, then according to the method of FIG. 3 it is necessary for the threshold value to be higher than the zero intensity before the inflammation point E, but only by the least possible extent. Depending upon the steepness of the increase in light intensity, the associated crankshaft angle will be variable. Disturbance levels can also contribute to an incorrect control value.

However, it is also possible to reduce the influence of disturbance variables by means of the detection of the increase point also shown in FIG. 4. To this end, the second timing circuit element 19 is provided, whose output signal places a threshold switch 36 in operational readiness over a selected crankshaft angle range. The input of the threshold switch 36 is connected with the output of the differentiating device 9, while the output of the threshold switch 36 controls a fourth signal-value holding means 37. This element 37 is connected in turn with the integrator 8 and it emits a control signal which corresponds to the angular range in which the increase point E occurs. Thus it is assured that only the light value within this range will be evaluated, rather than light values resulting directly from the ignition spark itself. Between the actual instant of ignition and the point of inflammation, there is known to be a phase of ignition delay. In this phase, no light emission can yet be measured. With the control value emitted by the fourth signal-value holding means 37, the ignition instant can now be regulated in a manner known per se with the aid of an open-loop control circuit 32', or else the mixture composition of the operational mixture being burned in the combustion chambers of the engine can be influenced in a manner known per se with the aid of a closed-loop engine smoothness control circuit 33.

The control signal $dS_i/dt$ or $dS_i/d\alpha$ emitted by the differentiating device 9 can furthermore be delivered to a filter 39, which permits the passage through it of the high-frequency components of the control signal. The signal present at the output of this high-pass filter is delivered, after rectification if needed, to a threshold device 40, which is placed in operational readiness by the third timing circuit element 20. The threshold device 40 is effective in the vicinity of the maximum of the light-intensity curve. With the threshold device 40, a minimum intensity is detected in a fluctuation K superimposed on the light-intensity curve, which is caused by knocking combustion on the part of the engine. The minimum-intensity value of the fluctuation K is delivered to a subsequent control device 41, by means of which measures can be taken to prevent knocking. Such measures include shifting the instant of ignition, varying the mixture composition, reducing the charge pressure, increasing the exhaust recirculation rate, and other known measures. In FIG. 2, the fluctuation of the light intensity which occurs during knocking combustion is indicated by broken lines. It has been demonstrated that these "knocking fluctuations" occur at an intensity which is substantially greater than what can be ascertained from the pressure diagram for the combustion chamber pressure. For this reason, it is particularly advantageous that the detection of light emission is well suited to early recognition of knocking combustion and its consequent prevention by means of a suitable regulatory intervention.

The apparatuses described can be realized both in internal combustion engines having externally-supplied ignition and in self-igniting engines. In the latter case, the instant of ignition is determined in a known manner by the instant when fuel is injected into the combustion chamber. In other words, it is possible in the case of both combustion methods to speak of an "instant of ignition"; in the first type, the triggering event is the emission of the ignition voltage, while in the second case the triggering event is the initiation of fuel injection.

Figure 5:
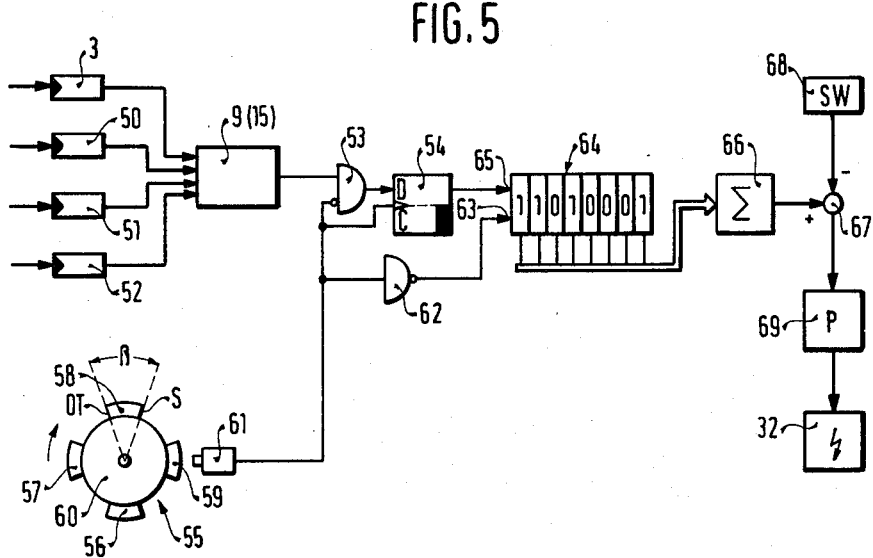
FIG. 5 shows a further exemplary embodiment of a closed-loop control circuit.

In the further exemplary embodiment shown in FIG. 5, the light signals in all the cylinders of the internal combustion engine are detected and delivered, in the case of a four-cylinder engine, to four optoelectronic converters 3, 50–52. The output signals of these optoelectronic converters are delivered to an evaluation circuit, which—as already noted—may be a differentiating device 9 having a built-in threshold recognition means or a maximum-value detector 15. What is essential is that a characteristic point of the curve of the light signal is detected. In the illustrated case, this is the inflammation point (or the maximum value). The output is carried via an AND gate 53 to the D input of a D flip-flop 54. A transducer arrangement 55 coupled with the crankshaft or the camshaft comprises a rotating element 60, which has on it the angle markings 56–59. These angle markings 56–59 are scanned by a sensor 61, which may be a Hall sensor, an inductive sensor, or an optical sensor, by way of example. In the exemplary embodiment, the rotating element 60 is connected with the camshaft of a four-cylinder engine. The angle markings 56–59 encompass an angle $\beta$ between a set-point crankshaft angle position S and top dead center OT, (FIG. 1 and FIG. 2) which is intended to agree with the characteristic point of the curve of the light signal.

The sensor 61 is connected with a further, inverting input of the AND gate 53, with the clock input C of the flip-flop 54, and with one input of an inverter 62, whose output controls the shift clock input 63 of a shift register 64. The output of the flip-flop 54 provides a further input 65 with the value to be stored in memory. The shift register has eight memory locations, which are connected to an adder 66. The output of the adder 66 furnishes the actual value to a summing point 67, with the set-point sum value being specified by a set-point transducer 68. The output of the summing point 67 is delivered via a regulator 69, a proportional regulator, for instance, to the open-loop control circuit 32 for the purpose of varying the instant of ignition. An open-loop control circuit of this kind, which is capable of varying the instant of ignition incrementally in one or the other direction in accordance with an input signal, is known, for instance from German Offenlegungsschrift No. 27 40 044.

Figure 6:
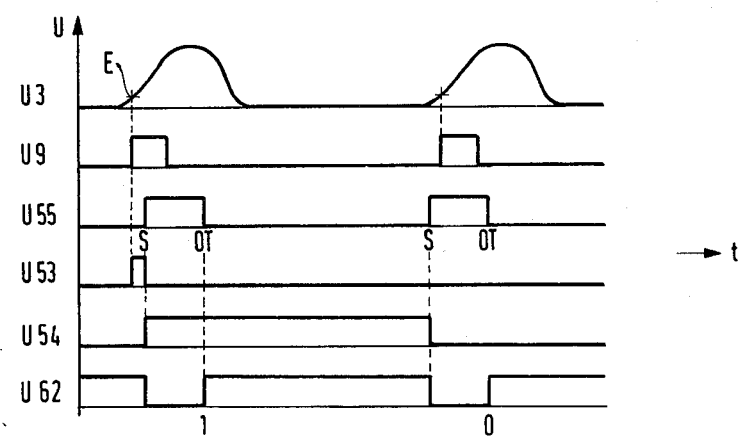
FIG. 6 is a signal diagram whose purpose is to explain the mode of operation.

The mode of operation of the exemplary embodiment shown in FIG. 5 will now be described, with the aid of the signal diagram given in FIG. 6.

The illustrated case is that in which the inflammation point E is evaluated in the differentiating device 9 as the characteristic point of the light-signal curve U3. On the output side, a signal U9 is generated, the leading edge of which coincides with the characteristic point E. In accordance with the angle markings 56–59, the transducer arrangement 55 provides a signal train U55. By means of the closed-loop control device shown in FIG. 5, the instant of ignition is to be regulated in such a way that the inflammation point (that is, the rising edge of the signal U9) coincides with the set-point crankshaft angle position S. In the first case illustrated, the inflammation point is too late; in the second case illustrated, the inflammation point is too early. This is expressed by the fact that in the first case the simultaneous occurrence of a signal U9 and of an inverted signal U55 causes an output signal U53 of the AND gate 53 to be generated. This output signal U53, because of the simultaneous occurrence of the leading edge of a clock signal 55, sets the flip-flop 54. With the subsequent leading edge of a signal U55, the flip-flop 54 is reset, unless a signal U53 was again generated. In the case where the inflammation point is too early (the second case illustrated), this has not occurred; that is, there is no signal U53. Upon each occurrence of the leading edge of the inverted transducer signal U62, the interrogation is made as to whether the flip-flop 54 is set; that is, whether the inflammation point was too late. The 1 signal present at the output of the flip-flop 54 at this instant is entered into the shift register 64. If the inflammation point is too early, then a 0 signal is correspondingly entered into the shift register. The result of regulation is an average value; that is, if four places in the memory, of the eight places available in the shift register 64, are occupied by 0 signals (for a too-early inflammation point) and four places are occupied by 1 signals (for a too-late inflammation point), then the average provides the correct instant of ignition, and no followup regulation is performed. The sum of all the memory contents, in this case, is the number four, which is compared in the summing point with the number four of the set-point transducer 68. When this number is exceeded by the sum of the values in the shift register 64, or when that sum fails to attain this number four, a corresponding followup regulation of the instant of ignition is effected.

The method illustrated by the described apparatus is suitable for both analog and digital regulation, preferably accomplished by a microprocessor. Instead of an electronic followup adjustment of the instant of ignition, this adjustment can also be effected via an adjusting member, for instance, acting upon the ignition distributor.

Instead of a single shift register 64 for the engine as a whole, a separate shift register can also be assigned to each cylinder of the engine. In this way, the engine status can also be monitored by means of a comparison of the contents of the various shift registers with one another. If the deviation among them is too great, then an appropriate warning may be made.

The foregoing relates to preferred exemplary embodiments of the invention, it being understood that other embodiments and variants thereof are possible within the scope of the invention, the latter being defined by the appended claims.

What is claimed and desired to be secured by Letters Patent of the United States is:

1. A method for regulating the combustion of metered operating substances to be delivered to the combustion chambers of an internal combustion engine using light signals arising in the combustion chamber as a control variable, comprising the steps of,
   detecting the light intensity over the course of combustion;
   differentiating a detected signal corresponding to the instantaneous light intensity in the combustion chamber;
   developing in response thereto at least one characteristic point, such as maximum, turning point, point of increase, in the curve of the differentiated signal as a reference control variable with respect to the crankshaft angle position; and
   triggering in response to the reference control variable a closed-loop control device of the internal combustion engine.

2. A method as defined by claim 1, wherein on the basis of the differentiated signal at least one of the turning points and the crankshaft angle position corresponding thereto is detected as an actual value and compared with a set-point value for the crankshaft angle, and the instant of ignition is corrected in accordance with the deviation of the actual value from the set-point value.

3. A method as defined by claim 1, wherein on the basis of the differentiated signal at least one of the turning points and one of the signal values, such as crankshaft angle position and light intensity, is detected in sequential operation cycles in at least one of the cylinders of the engine, the fluctuations of the signal values for at least one of the turning points are formed as a corresponding control variable which is compared with a set-point value for the permissible fluctuation width, and depending upon whether the set-point value fails to be attained, the proportion of one of the operating substances of the operating mixture of the engine, such as fuel, air and exhaust gas, is corrected.

4. A method as defined by claim 1, wherein on the basis of the differentiated signal at least one of the turning points and one of the signal values, such as crankshaft angle position and light intensity, is detected in sequential operating cycles in at least one of the cylinders of the engine, the fluctuations of the signal values for at least one of the turning points are formed as a corresponding control variable which is compared with a set-point value for the permissible fluctuation width, and depending upon whether the set-point value fails to be attained, the instant of ignition is corrected.

5. A method as defined by claim 1, wherein the differentated light-intensity signal is compared with a minimum value, and at the point where this is exceeded a control signal corresponding to the crankshaft angle position is formed as an actual value which is compared with a set-point value for the crankshaft angle, and in accordance with the deviation of the actual value from the set-point value, the proportion of one operating substance of the operating mixture of the engine is varied.

6. A method as defined by claim 1, wherein the differentiated light-intensity signal is compared with a minimum value, and at the point where this is exceeded a control signal corresponding to the crankshaft angle position is formed as an actual value which is compared with a set-point value for the crankshaft angle, and in accordance with the deviation of the actual value from the set-point value, the instant of ignition is varied.

7. A method as defined by claim 1, wherein the differentiated light-intensity signal is compared with a minimum value, and the light signal at the switchover point of a threshold switch in sequential cycles of the engine is stored as a fixed value, that on the basis of the values ascertained in sequential cycles of the engine and their fluctuations with respect to an average value, a control variable is formed which is compared with a set-point value for the permissible fluctuation width, and depending upon whether the set-point value fails to be attained, the proportion of one of the operating substances of the operating mixture of the engine is varied.

8. A method as defined by claim 1, wherein the differentiated light-intensity signal is compared with a minimum value, and the light signal at the switchover point of a threshold switch in sequential cycles of the engine is stored as a fixed value, that on the basis of the values ascertained in sequential cycles of the engine and their fluctuations with respect to an average value, a control variable is formed which is compared with a set-point value for the permissible fluctuation width, and depending upon whether the set-point value fails to be attained, the instant of ignition is varied.

9. A method as defined by claim 1, wherein the differentiated light signal is compared with a minimum value and a signal value corresponding to the crankshaft angle position at the switchover point of a threshold switch in sequential cycles of the engine is stored in memory as a fixed value, that on the basis of the ascertained signal values and their fluctuations with respect to an average value, a control variable is formed which is compared with a set-point value for the permissible fluctuation width, and depending upon whether the set-point value fails to be attained the proportion of one of the operating substances of the operating mixture of the engine is varied.

10. A method as defined by claim 1, wherein the differentiated light signal is compared with a minimum value and a signal value corresponding to the crankshaft angle position as the switchover point of a threshold switch in sequential cycles of the engine is stored in memory as a fixed value, that on the basis of the ascertained signal values and their fluctuations with respect to an average value, a control variable is formed which is compared with a set-point value for the permissible fluctuation width, and depending upon whether the set-point value fails to be attained the instant of ignition is varied.

11. A method as defined by claim 1, wherein on the basis of the differentiated signal at least one of the turning point points and at this point the absolute value of the signal itself as a signal representative of the speed of combustion is formed as a control variable for the purpose of metering quantities of recirculated exhaust gas.

12. A method as defined by claim 1, wherein on the basis of the differentiated signal at least one of the turning points and at this point the differentiated signal as a signal representative of the speed of combustion is formed as a control variable for the purpose of metering quantities of recirculated exhaust gas.

13. A method as defined by claim 1, wherein on the basis of the differentiated signal a signal component exceeding a specified frequency is filtered out, the amplitude of the fluctuation which has been filtered out is compared with a minimum value, and if the minimum value is exceeded a control device is triggered, whereby the operating characteristics are controlled for the purpose of preventing knocking combustion.

14. A method as defined by claim 1, wherein on the basis of the differentiated signal the maximum of the light intensity and the crankshaft angle position corresponding to the maximum are ascertained as an actual value which is compared with a set-point value for the crankshaft angle position at that point, and in accordance with the deviation of the actual value from the set point value the proportion of one operating substance of the operating mixture being combusted in the engine is varied.

15. A method as defined by claim 1, wherein on the basis of the differentiated signal the maximum of the light intensity and the crankshaft angle position corresponding to the maximum are ascertained as an actual value which is compared with a set-point value for the crankshaft angle position at that point, and in accordance with the deviaton of the actual value from the set point value the instant of ignition is varied.

16. A method as defined by claim 1, wherein on the basis of the signal for the light intensity, the maximum of the light intensity and the crankshaft angle position corresponding to the maximum are ascertained as an actual value which is compared with a set-point value for the crankshaft angle position at that point, and with the deviation of the actual value from the set-point value the proportion of one operating substance of the operating mixture being combusted in the engine is varied.

17. A method as defined by claim 1, wherein on the basis of the signal for the light intensity, the maximum of the light intensity and the crankshaft angle position corresponding to the maximum are ascertained as an actual value which is compared with a set-point value for the crankshaft angle position at that point, and with the deviation of the actual value from the set-point value the instant of ignition is varied.

18. A method as defined by claim 1, wherein with an rpm signal pertaining to the cylinder in whose combustion chamber light emission is detected, at least one timing circuit element is controlled, whereby a control signal can be emitted over a selected crankshaft angle range beyond a reference crankshaft angle, for controlling as operationally ready evaluation devices of the light signal.

19. A method as defined by claim 1, wherein a signal generated at the characteristic point is compared with a signal generated at a set-point crankshaft angle position with respect to the sequence over time of a plurality of cycles, in accordance with the ascertained sequence respectively one of two different values is stored in memory, the sum of the stored values as an actual value is compared with a set-point sum value, and in accordance with the deviation the proportion of one of the operating substances of the operating mixture of the engine is varied.

20. A method as defined by claim 1, wherein a signal generated at the characteristic point is compared with a signal generated at a set-point crankshaft angle position with respect to the sequence over time of a plurality of cycles, in accordance with the ascertained sequence respectively one of two different values is stored in memory, the sum of the stored values as an actual value is compared with a set-point sum value, and in accordance with the deviation the instant of ignition is varied.

21. A method as defined by claims 19 or 20, wherein the set-point sum value corresponds to the sum of a respectively identical number of the different stored values.

22. A method as defined by claim 21, wherein the storage is effected over the course of a multiplicity of cycles into a shift register.

23. A method as defined by claim 21, wherein a storage of values is effected separately for at least two cylinders, and by comparison of the stored values an impermissible deviation is ascertained.

24. A method for regulating the combustion of metered operating substances to be delivered to the combustion chambers of an internal combustion engine using light signals arising in the combustion chamber as a control variable, comprising
detecting the light intensity over the course of combustion;
integrating the light intensity signal as a signal for the combustion chamber status;
developing in response thereto a reference control variable, and
triggering in response to the reference control variable a closed-loop control device of the internal combustion engine.

25. A method as defined by claim 24, wherein the fluctuations of the integrated light signal with respect to the average value are taken as the measurement variable for the smoothness of operation of an engine having internal combustion, and the comparison with a permissible fluctuation width is used for the purpose of regulating the fuel-air mixture and the recirculation of exhaust gas.

26. A method as defined by claim 24, wherein the fluctuations of the integrated light signal with respect to the average value are taken as the measurement variable for the smoothness of operation of an engine having internal combustion, and the comparison with a permissible fluctuation width is used for the purpose of regulating the instant of ignition.

27. A method as defined by claim 24, wherein the integrated light signal is used as a reference variable for the detected light signal itself.

28. A method for regulating the combustion of metered operating substances to be delivered to the combustion chambers of an internal combustion engine using light signals, arising in the combustion chamber as a control variable, comprising detecting the light intensity over the course of combustion;

integrating the signal for the light intensity as a signal for the combustion chamber status;

developing in response thereto an optimum control variable, and varying in response to the optimum control variable the operating mixture composition.

29. A method for regulating the combustion of metered operating substances to be delivered to the combustion chambers of an internal combustion engine using light signals, arising in the combustion chamber as a control variable, comprising detecting the light intensity over the course of combustion;

integrating the signal for the light intensity as a signal for the combustion chamber status;

developing in response thereto an optimum control variable, and varying in response to the optimum control variable the instant of ignition.

* * * * *